May 22, 1962  A. N. KARAVIAS  3,035,484
IMPROVEMENTS IN OR RELATING TO MOVING PICTURE SYSTEMS
Filed March 21, 1957  3 Sheets-Sheet 1
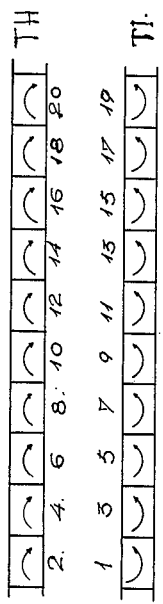
Fig 2.
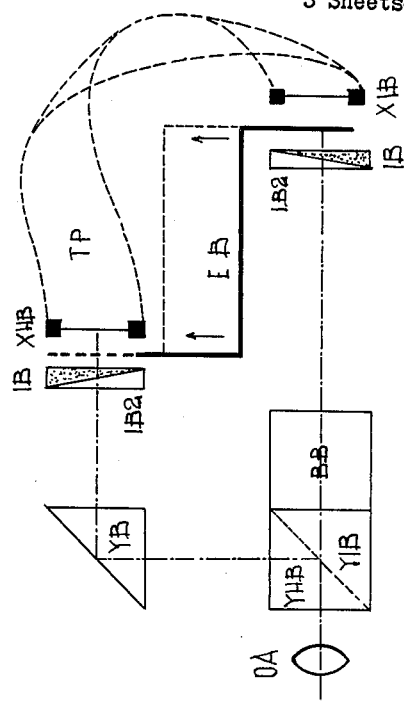
Fig. 3.
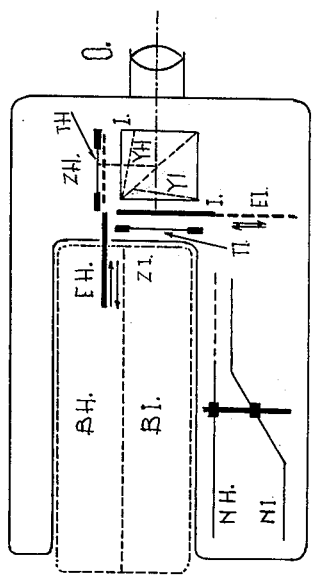
Fig. 4.
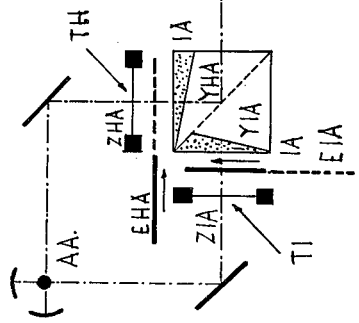
Inventor-
Alexander N. Karavias
BY
Charles J. Elderkin
Attorney

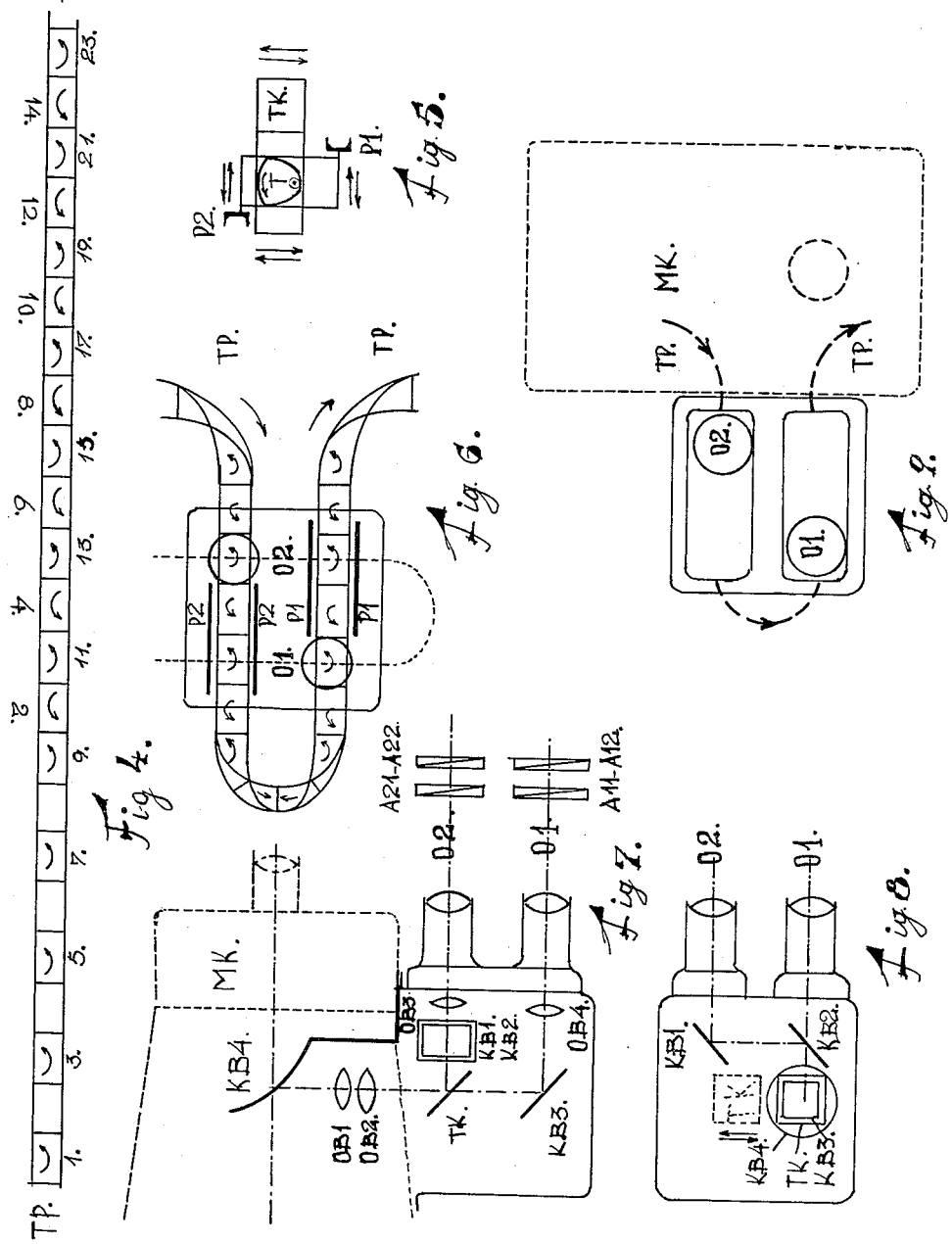

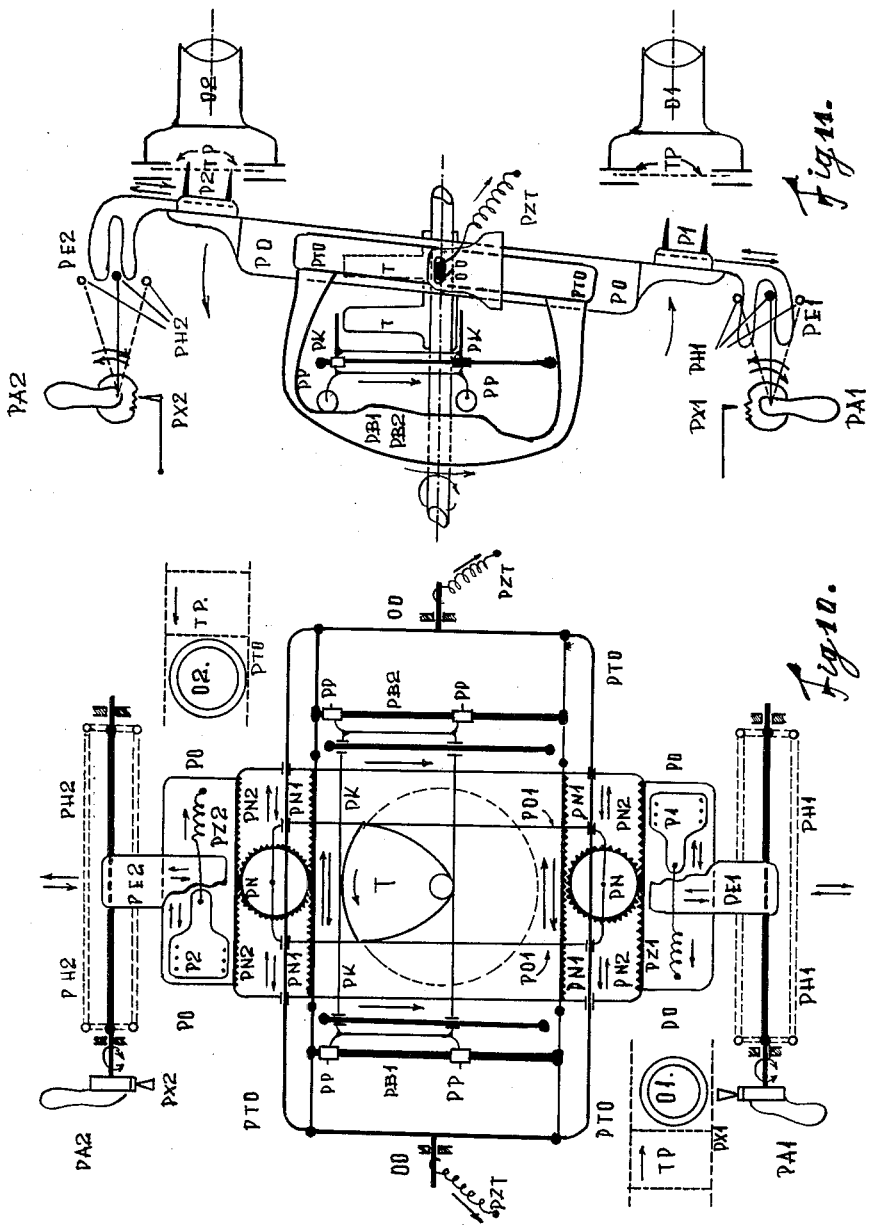

United States Patent Office 3,035,484
Patented May 22, 1962

3,035,484
IMPROVEMENTS IN OR RELATING TO MOVING PICTURE SYSTEMS
Alexander N. Karavias, 21a Aristotelous St., Athens, Greece
Filed Mar. 21, 1957, Ser. No. 647,606
2 Claims. (Cl. 88—24)

This invention relates to moving picture films and to novel cameras and projectors for taking and projecting such films.

One feature of the invention consists in the provision of a moving picture camera or projector in which two series of frames on film are exposed or projected, frames in a sequence being alternate in each series, means being provided in the camera or projector for fading each frame in either series into the succeeding frame in the other series, and means also being provided for advancing each series of frames during exposure of a frame of the opposite series, whereby continuous exposure or projection is obtained during the sequence.

Preferably the fading is achieved in the camera by equally dividing the incoming light between two gates controlled by a pair of synchronized shutters arranged so that as one shutter is progressively shielding a frame of film in its corresponding gate the other shutter is exposing the complementary portion of the succeeding frame, whereby during the transitional period between the complete exposure of one frame and the next, the exposed portions of the two frames are exposed to complementary portions of their respective halves of the incoming light.

Also, the fading in the projector is advantageously achieved by the provision of a reciprocable mirror which in limit positions reflects light from a light source selectively towards two gates and during its movement from one limit position to the other reflects light progressively onto decreasing and increasing complementary portions of the respective gates, the frame appearing in each gate being changed during the time that the reciprocable mirror is retained in the opposite corresponding limit position.

The invention further consists in a method of making a moving picture film, comprising making two series of negative frames by exposing a frame of one series fading in a frame of the opposite series, advancing said one series during exposure of the opposite series, fading back to said one series, and repeating this cycle of events during a complete shooting sequence so that continuous exposure is obtained during the whole sequence; and subsequently printing a positive film from said two series of negative frames. The invention also contemplates moving picture films so made.

Further, to produce best results, optical balancing is provided during printing to compensate for the increased exposure of the parts of the respective frames which are exposed for the greater part of the fading period.

The invention still further consists in a printing machine in which fading is achieved in the printing machine by providing two gates adapted to contain frames to be projected successively and to be exposed to equal beams of light, the gates being controlled by synchronized shutters arranged so that, as one shutter is closing and the other is simultaneously opening, the separate portions of the picture being projected are complementary.

The advantages of the invention include the freeing of shooting and projection from discontinuities, so that they may both be absolutely continuous, practically eliminating flicker and the spectator's eye-strain.

The invention also allows for the reduction of the number of pictures shot and projected per second to ten or less, so that it is possible either (a) to increase the size of the picture on horizontally moving film, while somewhat reducing the total length of the film, or (b) to reduce substantially the overall length of the film.

The invention also doubles the luminoisity of the projection with no increase of the power of the source of light; completely eliminates stroboscopic irregularities and jumping movements; does not alter the subjective optical impression of colors in color films due to discontinuities; and allows use of lower sensitivity films during shooting due to the reduction of the number of the pictures shot per second.

Projection may be carried out in two ways; one uses conventional projectors with the usual sequence of images which system, of course, introduces discontinuities, and the other an additional projection assembly with the sequence of images properly disposed in order to obtain a continuous projection.

The invention will be further described with reference to the accompanying drawings, wherein:

FIGURE 1 is a diagrammatic representation of an embodiment of a camera according to the invention;

FIGURE 2 is a diagrammatic illustration of the sequence of shooting;

FIGURE 3 is a diagrammatic representation of a printing apparatus according to the invention;

FIGURE 4 illustrates the printing sequence of the apparatus of FIGURE 3;

FIGURE 5 illustrates a method of advancing the film in the projector;

FIGURE 6 is a diagrammatic elevation of a projection attachment for use with a conventional projector;

FIGURE 7 is a diagrammatic plan view of the projection attachment on a conventional projector;

FIGURE 8 is a side elevation of the attachment;

FIGURE 9 illustrates the path of the film being projected; and

FIGURES 10 and 11 are respectively front and side elevations of a frame advance mechanism for use in the projector.

By optical compensation is meant the progressive partial obscuring of that side of a frame which is last shielded during closure of a shutter.

By photographic compensation is meant compensation for inequalities of exposure time by providing corresponding shutters and possibly optical compensation in the printing machine.

The system illustrated will be described under separate headings for each of the three operations involved in producing a motion picture film.

*Shooting*

This is carried out with an optically compensated camera which, for continuous shooting, is loaded with two identical independent films placed into the two parallel boxes BI and BH (see FIGURE 1). These films pass in front of the two mutually perpendicular gates ZI and ZH which are alternately opened and closed by the two reciprocating shutters EI and EH, placed as near as possible to these two gates. The camera has in operation a single objective O, the beam through which is directed towards the two gates ZI and ZH, and split into two beams by the double prism YI and YH having an intermediate semi-transparent metal-coated surface. The shutters move in perpendicular paths and when the one starts closing its gate, the other starts opening its corresponding gate from the corresponding side of the gate in equal proportions, so that during the whole transitional stage of the change of obturation of the picture gates, the two opened sections of these two gates contain complementary parts of pictures. Each shutter opening the gate and keeping stationary for a period, starts closing the gate from the same side, moving in the opposite direction.

However, this manner of movement of the shutters gives unequal times of exposure to the two opposite sides of each picture from the beginning of the opening of each gate to the end of its closure. To compensate this difference of exposure time, there may be used optical compensation in any of three different ways.

(1) A neutral obscuring prism inserted before each gate, cemented to the double prism YI and YH, from this last a part having been cut out to compensate the refracting ability of the prisms. Obscuring laminae of a gradually decreasing shade may be used instead of the prisms, the darker part of said prisms or laminae being situated towards that side of the gate which is exposed for a longer time.

(2) A lamina with transparent metal coating of gradually decreasing reflective ability, having its most intensely metallized side located nearest the side of the gate most exposed to the light.

(3) The intermediate surface of the beam splitting prisms may be semi-metallized, coated in a way to have a gradually decreasing reflective ability to attain a gradually differential change of the relation of transparency and reflection; the most metallized side of this surface being situated towards the top of the angle formed between the two gates.

Reciprocating movement is given to the shutters by two revolving discs NI and NH, fixed on the same shaft; these discs operate the two shutters through auxiliary linkage (not shown), a small wheel being interposed to decrease friction. Disc NH has two portions of differing radii, the difference between the radii being the same as the reciprocation stroke of shutter EH, which is operated by the revolution of disc NH. Disc NH has two equal portions in two spaced parallel planes with a distance between them corresponding exactly to the reciprocation stroke of shutter EI, which it operates. The curves of transition from the one position to the other of each disc are of such shape that the transpositions of the two shutters of the camera correspond exactly to the transpositions of the two shutters of the printing machine to be described hereinafter, and of the moving mirror of the projection assembly, also described hereinafter, wherein the film is to be used.

When the two perpendicular shutters move parallel to the perforations of the film, a single operating disc or triangular cam is able to operate both. In addition, the relative distance between the two shutters can be controlled at will, to vary the time of succession so that the objects in motion on the successively taken pictures will more or less cover each other.

Each of the two films move intermittently in turn, by one picture per cycle, through claws operated by one or two revolving triangular cams, through reciprocating linkage. The two films may move in the same direction or in opposite directions, both remaining stationary during the whole transitional stage of the change of obturation of the two gates; each film moves only during the time of full closure of the gate corresponding to that film.

In order to find out easily, when printing, the sequence of the successively shot pictures on the two films, a shadow pointer is inserted before each gate of the shooting camera and exactly at the same corresponding position; this pointer moves from its position, parallel to each gate, at each start of the camera, and is pulled by a centrifugal instrument outside the opening of the gates, but in the meantime the camera has made a few revolutions and both films have taken a few pictures, on which can be seen the respective displacement of the shadow of the withdrawing pointer.

A single film may be used instead of two films, that one film being folded to pass before thet two picture gates. The portions passing the gates are moved alternately by two pictures per cycle. This film is loaded in a suitably modified camera.

FIGURE 2 illustrates the two films TI and TH with photographs of the point of a bent arrow, to clearly show the sequence of pictures on the two shooting films.

Printing

The camera produces two negative films bearing the successively taken images complementary to each other during the transitional stage of opening and closing the picture gates. Since the images taken will comprise some objects which were moving and some which were stationary, the optical compensation of exposure time, during shooting, necessary to attain balance involves only the stationary objects. This is because the moving objects are changing position on the film. Therefore, further photographic compensation is preferably effected through the printing machine, when printing the positive film, so that its pictures bear photographs of moving and/or stationary objects optically and photographically compensated. This is accomplished through the incorporation, in the printing machine, of shutter and optical compensation means identical to these used in the camera. The use of such means in the printing machine is also necessary as the photograph of the stationary objects is not affected by the difference of exposure time, owing to the optical compensation. But, the photograph of the moving objects is independent of the exposure time, for the reason that the image of these objects is moving on the film and the optical compensation of the shooting camera has an unequal effect on the images of the moving objects on the pictures of the negative film. To compensate this unequal effect, optical compensation must also be used in the printing machine, to balance the influence of the optical compensation in the shooting camera, in combination with the operation of the shutters of the printing machine.

The printing machine (see FIGURE 3) is capable of printing two kinds of positive film, either from the two films or from the single folded film used in the camera, viz:

(1) A positive film having the normal sequence of pictures, for projection through conventional projectors. In this case, the full advantages of the system are not achieved but stroboscopic irregularities, jumping movements, and need for high sensitivity shooting film and intensive illumination during shooting are eliminated.

(2) A positive film bearing pictures alternately inverted—as if they were turned on their own plane by half a revolution—and specially disposed so that the successively taken pictures are spread apart by a constant number of pictures (it is practically impossible for this number to be less than six). The film with pictures of a special disposition can only be projected through a special projector or attachment. This case to be described hereinafter constitutes the full system according to the invention with all its advantages.

To print the film bearing the special disposition of pictures, the printing machine is equipped with one or two sources of light AA, to illuminate the two gates ZIA and ZHA in front of which the two negative films TI and TH pass. The luminous pencil, coming out of each gate through the open section of each of the two gates ZIA and ZHA, which are closed in turn by the two reciprocating shutters EIA and EHA, is directed towards lens OA through double prism YIA and YHA, having an intermediate semi-transparent mirrorized surface, and through the photo-compensation prisms IA and IA similar to these described with reference to FIGURE 1. The luminous pencil, coming out of lens OA passes through the beam splitting prism YIB and YHB, and being divided into two by it, is projected through glass block BB towards gate XIB of positive film TF and through total reflection prism YB onto the other gate XHB of the same positive film TP. Cubic glass block crystal BB is merely used to compensate the thickness of the total reflection prism YB. A photo-compensation element is inserted before each of the two gates XIB and XHB, compensating the difference of the exposure time given by double shutter EIB, which obturates in turn the two gates XIB and XHB of the positive film. Synchronous with shutters EIA and EHA, shutter EIB operates, obturating the same section on the positive film TF as the corresponding picture on each of the two negative films TI and TH. Positive film TP passes in front of the two gates XIB and XHB, being folded as shown, so that the pictures printed on it will be alternately inverted. All inverted pictures are printed through the same gate. At each revolution of the printing machine, through revolving triangular cams, the positive film advances in its two parts in turn by two frames for each stroke of the claw operating this part; each of the two negative films advances in turn by one frame per stroke of the claw moving each film (exactly as these two films were moving during shooting). All shutters start obturating the gates of the corresponding pictures at the same time, and do so from the same side of the pictures from which the obturation started during shooting.

The example of a film thus printed is shown in FIGURE 4, and is of a type designed for projection through a special projector to be described hereinafter.

This same printing machine may also be used to print a positive film of normal sequence of pictures, if necessary changing the size of each positive picture, in relation to the size of each negative picture of the negative film, which moves, preferably, horizontally during shooting. It will be understood that owing to the slower rate of shooting in the camera above described, it is necessary to increase the number of frames on the film for conventional projection. The printing of the positive film, bearing its pictures in the normal sequence, is effected either by simply repeating the frames to increase the number of negative pictures on the positive film, or by repeatedly printing each negative picture on the positive film while at the same time printing this same negative picture together with the next negative picture. Thus, for example, in order to double the number of pictures, each frame of each negative film is printed twice in succession alone, or is printed once alone and once together with the next picture of the other negative film, the gate of this negative film being then gradually and complementarily opened. The two claws are periodically withdrawn from the active position and, through a cam revolving at the rate of a quarter of the revolutions of the printing machine, advance the two negative films by one picture, once in every four strokes; each of the negative films advances at the third stroke of the claw which moved the other negative film, while the positive film advances by one picture per stroke through the claw operating it. Double prism YEB and YIB, as well as glass block BB are shifted outside the optical pencil of rays (as useless), while the positive film to be printed moves perpendicularly in relation to the two negative films, only if these were moving horizontally during shooting.

To print from a single folded negative film, the negative film will be folded to pass in front of the two picture gates and will move as described above, but by two pictures per effective stroke of the two claws which advance in an opposite direction the two parts of that film, the stroke of these claws being doubled.

The relative distance of the two shutters of each pair is adjustable at will so that, the time of succession varying, the images of the objects in motion on the successively taken pictures will more or less cover each other.

*Projection*

This is effected either through normal projectors with the use of a film according to (1) under Printing, or through a special continuous projection apparatus, or an additional assembly for continuous projection externally adapted to the side of a conventional projector with the use in the latter two cases, of a film according to (2) under Printing which bears alternately inverted and specially disposed pictures.

The projection assembly is adapted to be mounted externally on the side of a conventional projector, taking its motion therefrom by some external shaft through a gearbox, and the light by means of an auxiliary mirror inserted into the front part of the lantern of a normal projector through an operable door. Continuous projection is effected through two identical lenses of the assembly, operating alternately, non-intermittently through the change of the illumination direction from one gate onto the other, by means of a reciprocating mirror and by reflections on auxiliary stationary mirrors. The film is placed in the conventional projector, changing its normal disposition therein so that, instead of passing before the projection gate of the projector, it passes before the two projection gates of the assembly, being folded and advancing intermittently either horizontally or vertically by two pictures per stroke of the claw alternately on its two parts.

For correct projection on the screen, the same picture must stop being illuminated from the same side and on exactly the same section successively, as the corresponding shutter of the camera had started obturating it during shooting. This is attained through the reciprocating mirror of the assembly. The projection lens which will project the inverted pictures must be invariable.

The balanced projection assembly advances the film intermittently by means of claws P1 and P2 (FIGURE 5) on two of its parts periodically, alternately by two frames per stroke. Only the part of the film for which the corresponding picture gate is not illuminated, advances. These claws operate horizontally, reciprocating through the revolving triangular cam T, for horizontally moving film, by means of a reciprocating movable linkage. The movement of the claws, operated by revolving triangular cams, insures complete immobility of the two parts of the film during the whole transitional stage of the change of the direction of the illumination from one projection gate onto the other. Another triangular cam of similar shape to triangular cam T on the same shaft, operates mirror TE (see also FIGURE 8) vertically, through another reciprocating, vertically moving, linkage. This mirror changes the direction of the pencil of rays of the source of light, from one projection gate onto the other, by periodically shifting outside the luminous cone and, the latter falling then upon mirror KBS, is directed towards lens O1, and inside the luminous cone, the latter being reflected by mirrors TK, KB2, KB1, is directed towards lens O2, (if there are two luminous cones, two reciprocating shutters are used instead of a moving mirror).

FIGURE 6 illustrates the positions of the two projection lenses O1 and O2, the strokes of claws P1 and P2, as well as the course of a film moving horizontally (the dotted line illustrates the course of the film, if moving vertically on an assembly of appropriate construction).

FIGURE 7 illustrates, in top view, the assembly adapted to the conventional projector MK, the two lenses O1 and O2, moving mirror TK, as well as the auxiliary stationary mirrors KB1, KB2, KB3, KB4. Mirror KB4 is inserted into the lantern of the projector MK through a door made at the side of the front part of the lantern containing the source of light. Mirror KB4 is withdrawn when the projector MK is used to project conventionally. These mirrors are placed in such positions that the cone of rays travels the same distance when directed to either projection gate. Lenses OB1, OB2, OB3, and OB4 are auxiliary lenses determining the convergence and shape of the luminous cone, in case the curved mirrors are not used. Before each of the two projection lenses O1 and O2, there are placed two identical thin achromatic refractive prisms A11—A12 and A21—A22 (or non achromatic, owing to their low diopter ability), each one of which can be turned to the desired extent around the optical axis of the projection lens, in the same or the opposite directions. These prisms control the direction of projection of each lens, so that the picture of the two projections of the two lenses may coincide exactly when projected on the screen.

The apparatus illustrated in FIGURES 10 and 11 is incorporated in the projection assembly already described, for feeding each part of the film, two frames at a time, independently of the other part.

FIGURE 10 illustrates schematically the front view of the revolving double triangular cam T and the two perpendicularly and rectilinearly reciprocating linkages (also shown in FIGURE 5) with the addition of the parts of the intermittant feed mechanism. FIGURE 11 illustrates schematically the side view of the same apparatus. The shapes of the various members schematically illustrated may be changed according to particular needs.

When double triangular cam T revolves, one part of the cam causes member PO to reciprocate in a rectilinear manner. The other part of the cam causes member PK to reciprocate in a perpendicular direction. Member PK, according to its respective positions, causes, through four small wheels PP (which may be omitted), an alternating change of inclination of the two guides PB1 and PB2 of a curved and broken line shape best seen in FIGURE 11, which are secured to the two sides of frame PTO.

The change of inclination is effected under the influence of the two springs PZT, which act on the two small shafts of frame PTO, urging it towards the two projection gates. Thus, the whole frame PTO, which is held by two small shafts on two elongated openings OO and the member PO, which reciprocates on its two slides, are both slightly changing their inclination, periodically reversing according to the position of wheels PP, so that claws P1 and P2, which are attached to movable member PO, may get in turn (through the influence of the two springs PZT, devised for the protection of the film), according to the course of inclination of frame PTO and member PO, either into the perforations of one part of projection film TP, which is in front of the projection gate of lens O2 (as illustrated in FIGURE 11) or into the perforations of the other part of the projection film TP, which is in front of the gate of the other lens O1.

The shape of guides FB1 and FB2 is such that the claws, while operating one part of the film, should remain throughout in the perforations of the film.

The framing control per perforation of the film is effected separately on each of its two alternately moving parts, during projection as follows:

Claws P1 and P2 may move on member PO according to the order of the film perforations. But the locking of the position of each claw on member PO depends on the position of each of two perpendicularly movable scale instruments PE1 and PE2. However, the position of each of the two scale instruments PE1 and PE2 depends on the parallel of each of the two straight guides PH1 and PH2 throughout its length. Straight guides PH1 and PH2 change position when the operator turns one of the two hand wheels, PA1 and PA2, which are connected respectively to each of the two straight guides PH1 and PH2.

In this way, each of the two handwheels PA1 and PA2 independently controls the position of the film picture at each one of the two projection gates. Hand wheels PA1 and PA2 are locked in their respective positions through pawls PX1 and PX2, which co-operate with teeth on the handwheels. Claws P1 and P2, pulled by springs PZ1 and PZ2, get into the slots of the scale instruments PE1 and PE2, locking the latter into their respective positions, so that they will not rub onto the straight guides PH1 and PH2 after they are transferred.

The scale step of each slot of scale instruments PE1 and PE2 is exactly the same as the step of two consecutive perforations of the film.

In order to double (or otherwise vary according to circumstances) the length of the reciprocating stroke of member PO in relation to the size of the eccentricity of double triangular cam T, this cam, instead of operating directly equipment PO, operates the intermediate equipment PO1 bearing two gears PN coupled to the two stationary toothed battens PN1, secured to frame PTO, as well as to two other teethed battens PN2, secured to member PO. The same process can apply to member PK.

In order to determine which part of the film has gone out of place, there is next to each of the two projection gates, an auxiliary gate through which the operator can see either directly or through a mirror, slightly illuminated, the picture of the projection film, thus detecting at once which of the two parts of the projection film has deviated its picture from the normal position of the projection gate.

All the above described instruments, through which the projection assembly operates, may be incorporated into a special moving picture projector of continuous projection, specifically made for that purpose.

I claim:

1. A moving picture printer mechanism for producing a composite positive film bearing alternately inverted pictures disposed so that the successively taken pictures are spread apart by a constant number of pictures printed from two negative film series of complementary picture frames that comprises, a pair of light apertures having one each of said two negative series of picture frames mounted for movement thereacross, a light source mounted behind said light apertures and adapted to project light through each of said apertures and the respective picture frames transported thereacross, movable shutter elements mounted between said light source and each of said light apertures and adapted to shield the passage of light through its corresponding aperture when moved thereacross, means for alternately moving one of said shutter elements towards a closed position while simultaneously moving the other shutter element to an open position with respect to the light passing through said apertures, an optical system consisting of a double prism positioned to receive and transmit the light passed through each of said apertures and the respective picture frame transported in front of the same, a concentrating lens adapted to pass the transmitted light from said double prism, and a photo-division prism positioned to receive the light passed by said concentrating lens and to divide the same into two separate light beams, a pair of second light apertures adapted to have a single length of unexposed film transported in inverted relationship thereacross, said inverted relationship being effected through a half-turn twist in the unexposed film between said first and second pairs of light apertures, and each of the lengths of unexposed film being positioned to receive one of said separate light beams from said photo-division prism, second movable shutter elements mounted between each of said second light apertures and the film positioned thereacross, means for alternately moving one of said second shutter elements towards a closed position while simultaneously moving the other shutter element to an open position with respect to light transmitted through said second apertures onto the unexposed film, and means for advancing the unexposed film a total travel of two frames for each pair of complementary picture frames on said negative film series, whereby a composite film containing alternately inverted frames of the negative film series is exposed on said unexposed film.

2. A moving picture printer mechanism for producing a positive film bearing alternately inverted pictures disposed so that the successively taken pictures are spread apart by a constant number of pictures printed from a negative film bearing pictures disposed so that successively taken pictures are a constant number of frames apart that comprises, a pair of light apertures having successive portions of said single series of negative picture frames mounted for movement thereacross, said movement corresponding to said constant number of frames between said successive pictures, a light source mounted behind said light apertures and adapted to project light through each of said apertures and the respective picture frames tranported thereacross, movable shutter elements mounted between said light source and each of said light apertures and adapted to shield the passage of light through its corresponding aperture when moved thereacross, means for alternately moving one of said shutter elements towards a closed position while simultaneously moving the other shutter element to an open position with respect to the light passing through said apertures, an optical system consisting of a double prism positioned to receive and transmit the light passed through each of said apertures and the respective picture frame transported in front of the same, a concentrating lens adapted to pass the transmitted light from said double prism, and a photo-division prism positioned to receive the light passed by said concentrating lens and to divide the same into two separate light beams, a pair of second light apertures adapted to have a single length of unexposed film transported in inverted relationship thereacross, said inverted relationship being effected through a half-turn twist in the unexposed film between said first and second pairs of light apertures, and each of the lengths of unexposed film being positioned to receive one of said separate light beams from said photo-division prism, second movable shutter elements mounted between each of said second light apertures and the film positioned thereacross, means for alternately moving one of said second shutter elements towards a closed position while simultaneously moving the other shutter element to an open position with respect to light transmitted through said second apertures onto the unexposed film, and means for advancing the unexposed film a total travel of two frames for each pair of picture frames on said negative film series, whereby a composite film containing alternately inverted frames of the negative film series is exposed on said unexposed film.

References Cited in the file of this patent

UNITED STATES PATENTS

| | | |
|---|---|---|
| 1,451,325 | Comstock | Apr. 10, 1923 |
| 1,457,500 | Comstock | June 5, 1923 |
| 1,467,466 | Willard | Sept. 11, 1923 |
| 1,680,534 | Garbutt | Aug. 14, 1928 |
| 1,802,530 | Pilny et al. | Apr. 28, 1931 |
| 1,894,265 | Chretien | Jan. 17, 1933 |
| 1,929,353 | Frisch | Oct. 3, 1933 |
| 2,080,443 | Sperberg | May 18, 1937 |
| 2,402,660 | O'Grady | June 25, 1946 |
| 2,517,250 | Shea et al. | Aug. 1, 1950 |
| 2,525,598 | Gruber | Oct. 10, 1950 |
| 2,557,685 | Rabinowitz | June 19, 1951 |
| 2,580,422 | Gunn | Jan. 1, 1952 |